US010864814B2

(12) United States Patent
Hummel

(10) Patent No.: US 10,864,814 B2
(45) Date of Patent: Dec. 15, 2020

(54) HYBRID DRIVE TRAIN FOR A HYBRID-DRIVE MOTOR VEHICLE

(71) Applicant: AUDI AG, Ingolstadt (DE)

(72) Inventor: Steffen Hummel, Flacht (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 16/344,958

(22) PCT Filed: Oct. 24, 2017

(86) PCT No.: PCT/EP2017/077204
§ 371 (c)(1),
(2) Date: Apr. 25, 2019

(87) PCT Pub. No.: WO2018/077902
PCT Pub. Date: May 3, 2018

(65) Prior Publication Data
US 2019/0270374 A1 Sep. 5, 2019

(30) Foreign Application Priority Data
Oct. 26, 2016 (DE) .......................... 10 2016 221 059

(51) Int. Cl.
*B60K 6/48* (2007.10)
*B60K 6/36* (2007.10)
(Continued)

(52) U.S. Cl.
CPC ................. *B60K 6/48* (2013.01); *B60K 6/36* (2013.01); *B60K 6/547* (2013.01); *F16H 3/093* (2013.01);
(Continued)

(58) Field of Classification Search
CPC ............. F16H 3/093; F16H 2003/0826; F16H 2003/0933; B60K 6/36; B60K 6/48;
(Continued)

(56) References Cited

U.S. PATENT DOCUMENTS 7,093,517 B2 * 8/2006 Hanyu ...................... B60K 6/36
475/5
2014/0283646 A1 * 9/2014 Moore ...................... B60K 6/36
74/661

FOREIGN PATENT DOCUMENTS

CN 104589994 A 5/2015
DE 10 2008 031 456 A1 1/2010
(Continued)

OTHER PUBLICATIONS

Notification of Transmittal of Translation of the International Preliminary Report on Patentability dated May 9, 2019, in connection with corresponding International Application No. PCT/EP2017/077204 (11 pgs.).
(Continued)

*Primary Examiner* — William C Joyce
(74) *Attorney, Agent, or Firm* — Maier & Maier, PLLC

(57) ABSTRACT

A hybrid drivetrain for a hybrid-drive vehicle, having a transmission, which can be shifted by shifting elements into different transmission steps, and which is connectable with respect to drive via an internal combustion engine shaft to an internal combustion engine, via an electric machine shaft to an electric machine, and via an output shaft to at least one vehicle axis. The internal combustion engine shaft and a pinion shaft, which can be connected with respect to drive to the output shaft, are connectable via spur gearwheel sets, which can be shifted by means of shifting elements and which each form gear planes, of which at least one hybrid gear plane is additionally connectable to the electric machine shaft. A further gear plane, which is free of attachments with respect to the electric machine shaft, directly adjoins the hybrid gear plane.

13 Claims, 4 Drawing Sheets

(51) Int. Cl.
    *B60K 6/547*       (2007.10)
    *F16H 3/093*       (2006.01)
    *F16H 3/08*        (2006.01)

(52) U.S. Cl.
    CPC ............ *B60K 2006/4816* (2013.01); *B60K 2006/4833* (2013.01); *B60K 2006/4841* (2013.01); *B60Y 2200/92* (2013.01); *F16H 2003/0826* (2013.01); *F16H 2003/0933* (2013.01); *F16H 2200/0008* (2013.01); *F16H 2200/0069* (2013.01); *Y02T 10/62* (2013.01)

(58) Field of Classification Search
    CPC ............ B60K 6/547; B60K 2006/4816; B60K 2006/4833; B60K 2006/4841
    USPC .......................................................... 74/661
    See application file for complete search history.

(56) References Cited

FOREIGN PATENT DOCUMENTS

| | | |
|---|---|---|
| DE | 10 2010 030 567 A1 | 12/2011 |
| DE | 10 2011 101 151 A1 | 12/2011 |
| DE | 11 2012 003 012 T5 | 5/2014 |
| DE | 10 2013 005 252 A1 | 10/2014 |
| DE | 10 2013 206 176 A1 | 10/2014 |
| DE | 10 2013 210 013 A1 | 12/2014 |
| DE | 10 2014 013 579 A1 | 3/2015 |
| DE | 10 2014 210 042 A1 | 12/2015 |
| DE | 10 2014 109 169 A1 | 1/2016 |
| EP | 2 056 391 A1 | 5/2009 |
| EP | 2 204 894 A1 | 7/2010 |
| EP | 2 792 523 A2 | 10/2014 |
| EP | 2 808 197 A1 | 12/2014 |
| WO | 2010/047207 A1 | 4/2010 |
| WO | 2011/002921 A2 | 1/2011 |
| WO | 2013/007972 A1 | 1/2013 |
| WO | 2014/166745 A1 | 10/2014 |
| WO | 2015/140617 A1 | 9/2015 |

OTHER PUBLICATIONS

Examination Report dated Jul. 14, 2017 of corresponding German application No. 10 2016 221 059.9; 16 pages.

International Search Report and Written Opinion of the International Searching Authority dated Feb. 16, 2018 in corresponding International application No. PCT/EP2017/077204; 30 pages.

\* cited by examiner

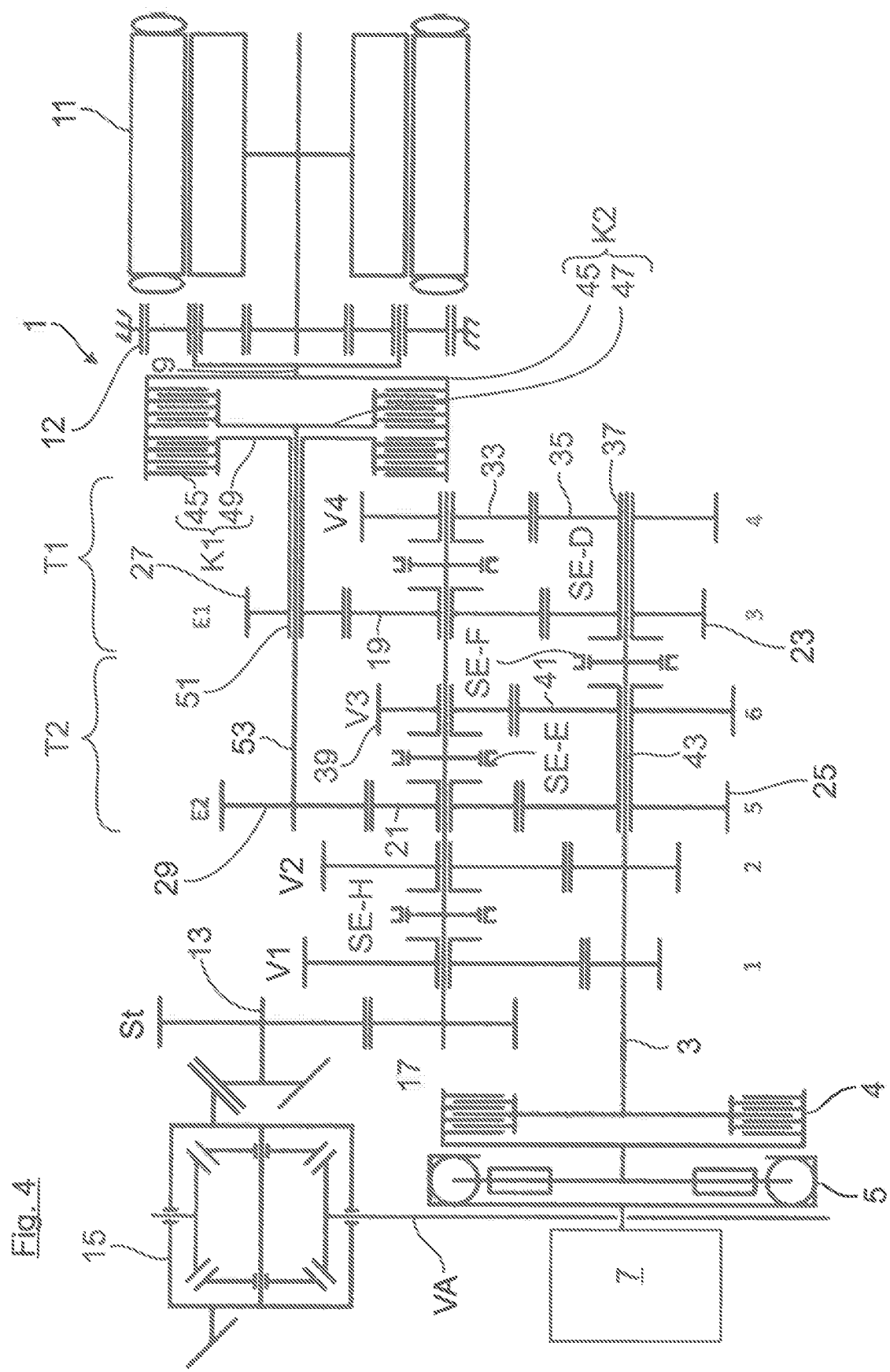

HYBRID DRIVE TRAIN FOR A HYBRID-DRIVE MOTOR VEHICLE

FIELD

The invention relates to a hybrid drivetrain for a hybrid-drive motor vehicle.

BACKGROUND

A hybrid drivetrain for a hybrid-drive vehicle is known from EP 2 792 523 A2. It comprises a transmission which can be shifted into different transmission steps by means of shifting elements and which is connectable with respect to drive via an internal combustion engine shaft to an internal combustion engine, via an electric machine shaft to an electric machine, and via an output shaft to at least one vehicle axle. The internal combustion engine shaft is connectable via spur gearwheel sets, which form gear planes, to a pinion shaft. This pinion shaft in turn outputs on the output shaft via a spur gear step. The gear planes of the hybrid transmission comprise a hybrid gear plane, which is connected with respect to drive to the electric machine shaft.

SUMMARY

The object of the invention is to provide a hybrid drivetrain, which has greater degrees of freedom in the functionality in a design which is structurally simple and favorable with respect to installation space in comparison to the prior art.

According to the invention, a further gear plane V3, V4, which is free of attachment with respect to the electric machine shaft, directly adjoins the hybrid gear plane E1, E2 in the axial direction. According to the characterizing part of patent claim 1, the hybrid gear plane E1, E2 and the further gear plane V3, V4 are components of a partial transmission T1, T2 having shifting elements K1, K2; SE-E, SE-F, SE-D, by means of which the partial transmission T1, T2 can be decoupled from the drivetrain, i.e., deactivated, during the transmission mode.

In this manner, with shifted internal-combustion-engine gears, the electric machine can be completely decoupled from the drivetrain. The moment of inertia of the activated partial transmission is thus advantageously reduced. Vice versa, with shifted electromotive gears, the internal combustion engine can also be completely decoupled from the drivetrain.

In one technical implementation, the hybrid gear plane E1, E2 can be constructed from an pinion-side gearwheel arranged on the pinion shaft, a drive-side gearwheel arranged on the internal combustion engine shaft, and a gearwheel arranged on the electric machine shaft. The gearwheel arranged on the electric machine shaft can be designed as a floating gearwheel and can be decoupled by means of the shifting element K1, K2 from the electric machine shaft or can be coupled thereto.

In one preferred embodiment, the transmission can comprise precisely two hybrid gear planes E1, E2. It is preferable if the electric machine shaft is entirely free of fixed gearwheels, which are arranged thereon in a rotationally-fixed manner, of the spur gearwheel sets, which form the gear planes of the transmission.

Moreover, it is preferred if the transmission is designed solely as a spur gear transmission, in which the internal combustion engine shaft, the electric machine shaft, and the output shaft are exclusively connectable to one another with respect to drive via spur gearwheel sets. In this manner, a simply constructed transmission structure is achieved, which is operable substantially more efficiently than a planetary gear.

As mentioned above, the further gear plane V3, V4 is free of attachments with respect to the electric machine shaft, in contrast to the hybrid gear plane. The further gear plane V3, V4 comprises an pinion-side floating gearwheel rotationally mounted on the pinion shaft, which can be coupled to the pinion shaft by means of a shifting element SE-D, SE-E. It is preferable if the shifting element SE-D, SE-E arranged on the pinion shaft can be shifted on both sides and is arranged in the axial direction between the pinion-side floating gearwheels, which are rotationally mounted on the pinion shaft, of the hybrid gear plane E1, E2 and the further gear plane V3, V4.

The above-mentioned further gear plane V3, V4 can moreover comprise a drive-side floating gearwheel rotationally mounted on the internal combustion engine shaft. It can be coupled by means of a shifting element SE-F to the internal combustion engine shaft. It is particularly preferable if the drive-side floating gearwheels, which are rotationally mounted on the internal combustion engine shaft, of the hybrid gear plane E1, E2 and the further gear plane V3, V4 are arranged rotationally-fixed on a common drive-side hollow shaft, which is rotationally-mounted coaxially on the internal combustion engine shaft and can be coupled via precisely one shifting element SE-F to the internal combustion engine shaft.

In one preferred refinement, the two hybrid gear planes E1, E2 can each be part of a first and a second partial transmission T1, T2, which are deactivatable in a transmission mode. In this case, it is preferable if the shifting element SE-F arranged on the internal combustion engine can be shifted on both sides and is arranged in the axial direction between the drive-side hollow shafts of the two partial transmissions T1, T2.

The shifting element arranged on the electric machine shaft can be implemented arbitrarily, for example, as a powershift freewheel clutch in combination with a clutch, as a powershift dual clutch, or as a non-powershift dual synchronizer. Moreover, the electric machine can be attached on the drive side or output side in the transmission. In the case of a drive-side attachment, the gearwheel of the hybrid gear plane E1, E2 arranged on the electric machine shaft can mesh with a drive-side floating gearwheel rotationally mounted on the internal combustion engine shaft. In the case of an pinion-side attachment, the gearwheel of the hybrid gear plane E1, E2 arranged on the electric machine shaft can mesh with an pinion-side floating gearwheel rotationally mounted on the output shaft.

The above hybrid concept can be implemented in a simple manner building on a conventional manual shift transmission and can be used especially for the front-wheel drive. The rear axle can possibly be mechanically decoupled from the front axle, but is drivable via a separate electric machine to implement a four-wheel-drive. In the above hybrid concept, the electric machine can preferably be positioned at the end of the transmission.

BRIEF DESCRIPTION OF THE DRAWINGS

The advantageous embodiments and/or refinements of the invention explained above and/or reflected in the dependent claims can be used individually or also in any arbitrary combination with one another—except, for example, in the cases of unambiguous dependencies or alternatives which cannot be unified.

The invention and its advantageous embodiments and refinements and the advantages thereof will be explained in greater detail hereafter on the basis of drawings.

In the figures:

FIG. 1 shows a transmission structure of a hybrid transmission embodied as a spur gear manual shift transmission according to a first exemplary embodiment;

FIG. 2 shows a second exemplary embodiment of the hybrid transmission in a view corresponding to FIG. 1;

FIG. 3 shows a third exemplary embodiment of the hybrid transmission in a view corresponding to FIG. 1; and FIG. 4 shows a fourth exemplary embodiment of the hybrid transmission in a view corresponding to FIG. 1.

DETAILED DESCRIPTION

Figure 1:
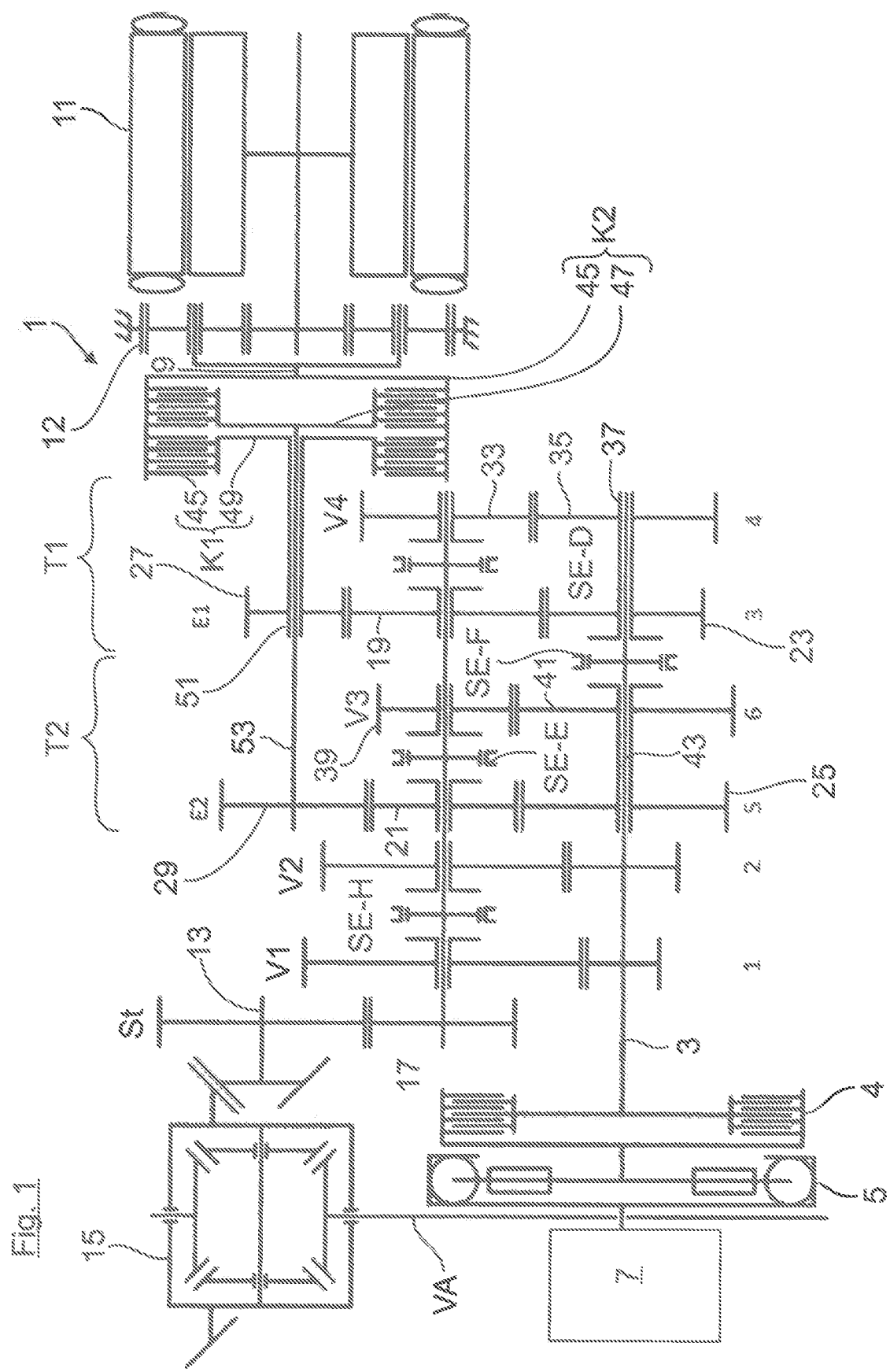

A manual shift transmission 1 is shown in FIG. 1, which is part of a hybrid drivetrain of a hybrid-drive motor vehicle (not shown). The transmission 1, which can be shifted by means of shifting elements into different transmission steps, is connected via an internal combustion engine shaft 3 having interconnected separating clutch 4 and torsion damper 5 to an internal combustion engine 7 and via an electric machine shaft 9 to an electric machine 11. The electric machine 11 can comprise a planetary reduction gear 12 shown in FIG. 1 for a torque conversion. Moreover, the transmission 1 is connected with respect to drive on the output side via an output shaft 13 to a front axle VA of the motor vehicle. The output shaft 13 is operationally connected as a pinion shaft to the bevel drive of a front axle differential 15.

As can furthermore be seen from FIG. 1, the internal combustion engine shaft 3, the electric machine shaft 9, and an interposed pinion shaft 17 are arranged axially-parallel to one another. The pinion shaft 17, the electric machine shaft 9, and the output shaft 13 are connectable to one another with respect to drive via spur gearwheel sets, which can be shifted via the shifting elements. The spur gearwheel sets form the gear planes V1 to V4 and E1 and E2, which are arranged parallel to one another and which are all located according to FIG. 1 in the axial direction between the internal combustion engine 7 and the electric machine 11.

The transmission structure of the hybrid transmission 1 shown in FIG. 1 is described hereafter: Thus, in FIG. 1, the internal combustion engine shaft 3 and the pinion shaft 17 are connected to one another via gear planes V1 to V4, which are each constructed from floating and fixed gearwheels meshing with one another. The floating gearwheels of the gear planes V1 to V4 can be coupled via shifting elements SE-H and SE-F to the respective supporting shaft 3, 17. The gear planes V1 to V4 are free of attachments with respect to the electric machine shaft 9.

Moreover, two hybrid gear planes E1, E2 are provided. Each hybrid gear plane E1, E2 comprises an pinion-side gearwheel 19, 21 arranged on the pinion shaft 17, which meshes respectively with a drive-side gearwheel 23, 25 arranged on the internal combustion engine shaft 3 and with an (electric-machine-side) floating gearwheel 27, 29 arranged coaxially to the electric machine shaft 9. The pinion-side gearwheels 19, 21 of the hybrid gear planes E1, E2 are arranged in FIG. 1 as floating gearwheels on the pinion shaft 17, the drive-side gearwheels 23, 25 of which are also rotationally mounted as floating gearwheels on the internal combustion engine shaft 3.

In FIG. 1, a total of two partial transmissions T1, T2 are provided, which can be shifted completely torque-free in a transmission mode, i.e., can be completely decoupled from the drivetrain, so that the first partial transmission T1 and/or the second partial transmission T2 is completely deactivated. The first hybrid gear plane E1 and a further, directly axially adjacent gear plane V4 are combined in the first partial transmission T1. The second hybrid gear plane E2 and a directly adjacent further gear plane V3 are combined with one another in the second partial transmission T2.

In the first partial transmission T1, the gear plane V4 comprises an pinion-side floating gearwheel 33 rotationally mounted on the pinion shaft 17. The pinion-side floating gearwheel 33 of the gear plane V4 and the pinion-side floating gearwheel 19 of the first hybrid gear plane E1 can be alternately coupled to the pinion shaft 17 via a shifting element SE-D, which is arranged therebetween and can be shifted on both sides. Both the first hybrid gear plane E1 and also the gear plane V4 comprise drive-side floating gearwheel 23, 25, which are rotationally mounted on the internal combustion engine shaft 3 and which are jointly arranged rotationally-fixed on a drive-side first hollow shaft 37. This shaft is coaxially rotationally mounted on the internal combustion engine shaft 3 and can be coupled via a shifting element SE-F to the internal combustion engine shaft 3.

The second partial transmission T2 is constructed structurally equivalent to the first partial transmission T1. In the second partial transmission T2, the gear plane V3 comprises an pinion-side floating gearwheel 39 rotationally mounted on the pinion shaft 17. The pinion-side floating gearwheel 39 of the gear plane V3 and the pinion-side floating gearwheel 21 of the second hybrid gear plane E2 can be alternately coupled to the pinion shaft 17 via a shifting element SE-E, which is arranged therebetween and can be shifted on both sides. Both the second hybrid gear plane E2 and also the gear plane V3 comprise drive-side floating gearwheels 25, 41, which are rotationally mounted on the internal combustion engine shaft 3 and which are arranged jointly rotationally-fixed on a drive-side second hollow shaft 43, which is rotationally mounted coaxially on the internal combustion engine shaft 3 and can be coupled via the shifting element SE-F to the internal combustion engine shaft 3. The shifting element SE-F, which is shared by the two hollow shafts 37, 43, can be shifted on both sides and is arranged between the two drive-side hollow shafts 37, 43.

As can furthermore be seen from FIG. 1, the two electric-machine-side gearwheels 27, 29 of the hybrid gear planes E1, E2 are shifted via a dual clutch, which is constructed from a first clutch K1 and a second clutch K2. The dual clutch has an outer plate carrier 45, which is connected in a rotationally-fixed manner to the electric machine shaft 9. The outer plate carrier 45 interacts with two inner plate carriers 47, 49 arranged adjacent to one another in the axial direction. The inner plate carrier 49 is arranged together with the electric-machine-side gearwheel 27 of the first hybrid gear plane E1 in a rotationally-fixed manner on a hollow shaft 51. In contrast, the inner plate carrier 47 is arranged together with the electric-machine-side gearwheel 29 of the second hybrid gear plane E2 in a rotationally-fixed manner on a solid shaft 53, which extends coaxially through the hollow shaft 51.

The transmission shown in FIG. 1 comprises a total of 16 gearwheels, four synchronizers, and two clutches K1, K2. Up to ten internal-combustion-engine gears can be shifted in the transmission 1, i.e., the six internal-combustion-engine direct gears VM1 to VM6 explained hereafter, which only use one gear plane, and the four torsion gears VM7 to VM10, which use at least two gear planes:

In the direct gears VM1 and VM2, the shifting element SE-H is shifted to the left or right, respectively, while the two partial transmissions T1, T2 are inoperative.

In the direct gear VM3, SE-F is shifted to the right and SE-D is shifted to the left. I.e., the partial transmission T1 is activated and the partial transmission T2 is deactivated. This also applies to the direct gear VM4, in which SE-F is shifted to the right and SE-D is also shifted to the right.

In the following direct gears VM5 and VM6, the partial transmission T2 is activated and the partial transmission T1 is deactivated. In the direct gear VM5, SE-F is shifted to the left and SE-E is shifted to the right. In the direct gear VM 6, SE-F is shifted to the left and SE-E is shifted to the right.

Of the following four internal-combustion-engine torsion gears VM7 to VM10, in the gear VM7, the shifting element SE-F is shifted to the right, the clutches K1 and K2 are actuated and the shifting element SE-E is shifted to the left. In the torsion gear VM8, SE-F is shifted to the right, the two clutches K1, K2 are actuated, and SE-E is shifted to the right. In the torsion gear VM9, SE-F is shifted to the left, the two clutches K1, K2 are actuated, and SE-D is shifted to the left. In the torsion gear VM10, SE-F is shifted to the left, the two clutches K1, K2 are actuated, and SE-D is shifted to the right.

In the solely electromotive mode of the transmission 1 shown in FIG. 1, up to 8 electromotive gears can be shifted, i.e., the following two direct gears EM1, EM2 and the six torsion gears EM3 to EM8:

Thus, in the direct gear EM1, the clutch K1 is actuated and the shifting element SE-D is shifted to the left. In the direct gear EM2, the clutch K2 is actuated and the shifting element SE-E is shifted to the left. In the electromotive torsion gear EM3, the clutch K1 is actuated and SE-D is shifted to the right. In the torsion gear EM4, the clutch K1 is actuated and SE-F is shifted to the right and SE-H is shifted to the left. In the torsion gear E5, the clutch K1 is actuated, SE-F is shifted to the right and SE-H is shifted to the right. In the torsion gear EM6, the clutch K2 is actuated and SE-E is shifted to the right. In the torsion gear EM7, the second clutch K2 is actuated, SE-F is shifted to the left, and SE-H is shifted to the left. In the torsion gear EM8, the clutch K2 is actuated, SE-F is shifted to the left and SE-H is shifted to the right.

From the above internal-combustion-engine gears VM1 to VM10 and the electromotive gears EM1 to EM8, up to 28 hybrid gears can be implemented in combination, in which electromotive and internal-combustion-engine gears are shifted in combination.

Special driving operating modes are highlighted hereafter, which are implementable by means of the transmission shown in FIG. 1:

Thus, stationary charging of the electric machine 11 is enabled using the transmission structure shown in FIG. 1, if the vehicle is at a vehicle standstill, for example, at a traffic signal or in a traffic jam. In this case, for example, the shifting element SE-F can be actuated to the right to connect the internal combustion engine shaft 3 to the first hybrid gear plane E1. At the same time, the clutch K1 (consisting of the outer plate carrier 45 and the inner plate carrier 49) is closed to connect the first hybrid gear plane E1 to the electric machine shaft 9. A torque flow can thus take place from the internal combustion engine 7 via the internal combustion engine shaft 3, the first hybrid gear plane E1, and the closed clutch K1 up to the electric machine 11.

Moreover, an internal combustion engine start can be carried out with the aid of the electric machine 11. The electric machine 11 can start the internal combustion engine 7 via a load path in which, for example, the second clutch K2 (consisting of the outer plate carrier 45 and the inner plate carrier 47) is closed and the shifting element SE-F is actuated to the left.

Furthermore, in FIG. 1, a shifting procedure between the internal-combustion-engine gears 1 to 6 can take place with the aid of the electric machine 11 without interruption of traction force, specifically, for example, with the aid of the electromotive gears EM1, EM2, which act as support gears during the internal-combustion-engine shifting. Such a shifting procedure is started with opening of the separating clutch 4 to decouple the internal combustion engine 7 from the transmission 1. An engaged electromotive support gear provides a support load path, which extends from the electric machine 11 to the drive side, during the shifting procedure taking place between the internal-combustion-engine gears. During the shifting procedure (i.e., the internal combustion engine 7 is decoupled from the drivetrain by means of the separating clutch 4), the electric machine 11 can thus generate a drive torque which is transmitted via the support load path to the output side.

The above state of affairs is explained hereafter on the basis of a shifting procedure free of an interruption of traction force between the third and fourth internal-combustion-engine gears, in which the electromotive second gear EM2 acts as a support gear: Thus, in the transmission 1 of FIG. 1, in the internal-combustion-engine third gear VM3, the shifting element SE-F is shifted to the right and the shifting element SE-D is shifted to the left. A load path thus extends from the internal combustion engine 7, the partial transmission T1, and the pinion shaft 17 up to the pinion-side spur gear drive St, while the partial transmission T2 is deactivated (stationary). At the beginning of the shifting procedure, the separating clutch 4 is disengaged and the shifting element SE-D is shifted into its neutral position. Moreover, the electromotive gear EM2, which acts as a support gear, is engaged, i.e., the plate clutch K2 is closed and the shifting element SE-E is shifted to the left, and the electric machine 11 is started up. A load transmission thus takes place from the electric machine 11 to the pinion shaft 17, during which the electric machine 11 generates an arbitrarily settable torque.

The shifting procedure into the target gear VM4 is continued by shifting the shifting element SE-D to the right from its neutral position. A load path is thus prepared from the internal combustion engine 7 via the shifting element SE-F, the gear plane V4, the shifting element SE-D, and the pinion shaft 17 up to the pinion-side spur gear drive St. At the end of the shifting procedure, the separating clutch 4 is closed again, i.e., the internal combustion engine 7 switches on, and the electric machine 11 is shut down again, so that the target gear VM4 is shifted and once again a load transmission takes place from the internal combustion engine 7 to the output side.

Therefore, any shift can be supported by means of an electromotive support gear in the transmission 1 of FIG. 1.

Moreover, an electromotive start from a vehicle standstill or a boost mode, in which multiple electromotive gears are available for boosting for individual internal-combustion-engine gears, is enabled by means of the transmission 1 shown in FIG. 1.

Figure 2:
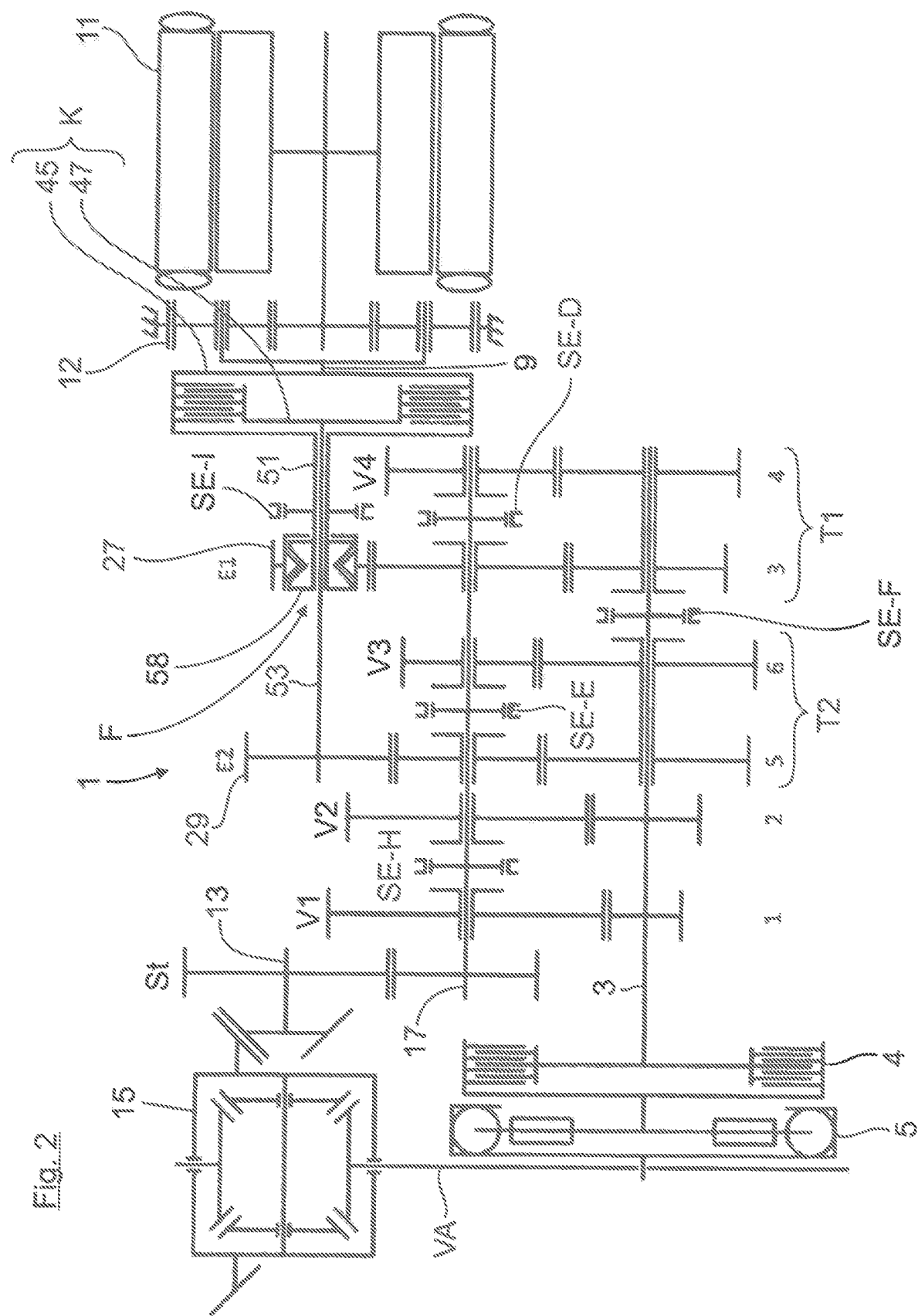
Figure 3:
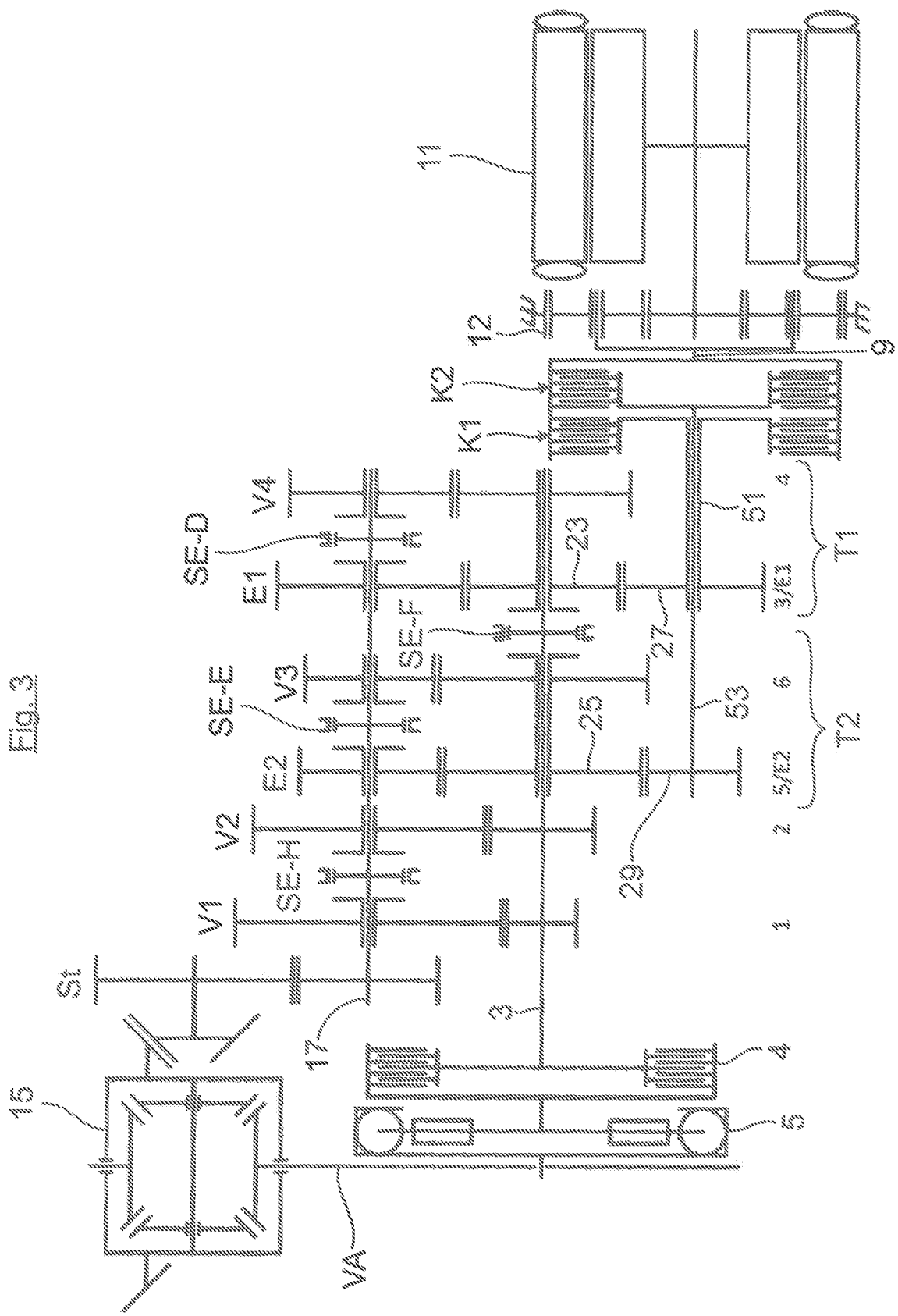

Modifications of the transmission 1 shown in FIG. 1 are described on the basis of following FIGS. 2 and 3:

Thus, in FIG. 2, the two electric-machine-side gearwheels 27, 29 of the hybrid gear planes E1, E2 are not connectable to the electric machine shaft 9 via a dual clutch (FIG. 1), but rather instead of this by means of a freewheel clutch F and a plate clutch K. The plate clutch K comprises an outer plate carrier 45, which is attached rotationally-fixed on both the electric machine shaft 9 and also the hollow shaft 51. The outer plate carrier 45 acts on an inner plate carrier 47. This carrier is arranged rotationally-fixed together with the electric-machine-side gearwheel 29 of the hybrid level 1 on the solid shaft 53, which extends coaxially through the hollow shaft 51. The gearwheel 27 of the first hybrid gear plane E1 is connectable via the freewheel clutch F to the hollow shaft 51. The freewheel clutch F is associated with a shifting element SE-I, which can be shifted into two operating positions: In the operating position shown, a torque transmission is enabled from the electric machine shaft 9 via the outer plate carrier 45 and via the hollow shaft 51 in the direction toward the gearwheel 27 of the first hybrid gear plane E1 and the freewheel function is activated in the opposite direction, i.e., a torque transmission is prevented. If the freewheel clutch inner side 58 connected to the hollow shaft 51 thus rotates faster than the gearwheel 27, the hollow shaft 51 drives the gearwheel 27. In a second operating position, the shifting element SE-I is shifted to the left in FIG. 2. In this case, a torque transmission is enabled in both directions. The electromotive gears can be powershifted both in FIG. 2 and also in FIG. 1.

In FIG. 3, the electric machine 11 is no longer attached on the output side to the transmission 1 (as in FIGS. 1 and 2), but rather is attached on the drive side to the transmission 1. In such a drive-side attachment, the electric-machine-side gearwheels 27, 29 of the hybrid gear planes E1 and E2 no longer mesh with the pinion-side gearwheels 19, 21 of the hybrid gear planes E1 and E2, but rather with the drive-side gearwheels 23, 25 of the hybrid gear planes E1 and E2.

An electromotive reverse gear is provided in FIGS. 1 to 3, in which the electric machine 11 is to be operated in the reverse direction.

A modification of the transmission structure shown in FIG. 3 is shown in FIG. 4. Accordingly, the electric-machine-side gearwheel 27 of the first hybrid gear plane E1, as in FIG. 3, is attached on the output side, i.e., it meshes with the associated pinion-side gearwheel 19 of the hybrid gear plane E1. In contrast to FIG. 3, however, in FIG. 4, the electric-machine-side gearwheel 29 of the second hybrid gear plane E2 is no longer in tooth engagement with the associated pinion-side gearwheel 21 of the second hybrid gear plane E2, but rather is attached on the drive side. This drive-side attachment is illustrated in FIG. 4 by means of a dashed double arrow, which is to represent a driving connection between the electric-machine-side gearwheel 29 and the drive-side gearwheel 25 of the second hybrid gear plane E2.

In such a transmission structure, an internal-combustion-engine reverse gear can be implemented, in which a load path is led from the internal combustion engine 7, the torsion damper 5, the closed separating clutch 4, the internal combustion engine shaft 3, the shifting element SE-F shifted to the left, the hollow shaft 43, the drive-side gearwheel 25 and the electric-machine-side gearwheel 29 of the second hybrid gear plane E2, the solid shaft 53, the closed clutches K1, K2, the hollow shaft 51, the electric-machine-side gearwheel 27, and the drive-side gearwheel 19 of the first hybrid gear plane E1, and the shifting element SE-D actuated to the left and the pinion shaft 17 up to the output side.

The invention claimed is:

1. A hybrid drivetrain for a hybrid-drive vehicle, comprising:
a transmission, which can be shifted by shifting elements into different transmission steps and which is connectable via an internal combustion engine shaft to an internal combustion engine, via an electric machine shaft to an electric machine, and via an output shaft to at least one vehicle axle, wherein the internal combustion engine shaft and a pinion shaft, which can be connected with respect to drive to the output shaft, are connectable via spur gearwheel sets, which can be shifted by shifting elements and which each form gear planes, of which at least one hybrid gear plane is additionally connectable to the electric machine shaft, wherein a further gear plane, which is free of attachments with respect to the electric machine shaft, directly adjoins the hybrid gear plane, wherein the hybrid gear plane and the further gear plane are components of a partial transmission having shifting elements, by which the partial transmission can be decoupled from the drivetrain during the transmission mode, wherein the hybrid gear plane includes a floating pinion-side gearwheel arranged on the pinion shaft, a drive-side gearwheel arranged on the internal combustion engine shaft, and an electric-machine-side gearwheel, and the electric-machine-side gearwheel is designed as a floating gearwheel and can be decoupled from the electric machine shaft or coupled thereto by means of the shifting element, wherein the further gear plane includes a pinion-side floating gearwheel, which is rotationally mounted on the pinion shaft and can be coupled by one of the shifting elements to the pinion shaft, and a first shifting element arranged on the pinion shaft can be shifted on both sides and is arranged in an axial direction between the pinion-side floating gearwheels, which are rotationally mounted on the pinion shaft, of the hybrid gear plane and the further gear plane, wherein the first shifting element is decoupled in a neutral position from the hybrid gear plane and the further gear plane and the first shifting element either couples the pinion-side floating gearwheel of the further gear plane to the pinion shaft in a first shifting position or couples the pinion-side floating gearwheel of the hybrid gear plane to the pinion shaft in a second shifting position wherein in the partial transmission, the further gear plane includes a drive-side floating gearwheel rotationally mounted on the internal combustion engine shaft, which can be coupled by a second shifting element to the internal combustion engine shaft, which are rotationally mounted on the internal combustion engine shaft, of the hybrid gear plane and the further gear plane are arranged in a rotationally-fixed manner on a pinion-side hollow shaft, which is coaxially rotationally mounted on the internal combustion engine shaft and can be coupled via precisely one shifting element to the internal combustion engine shaft.

2. The drivetrain as claimed in claim 1, wherein the transmission has precisely two hybrid gear planes.

3. The drivetrain as claimed in claim 2, wherein the two hybrid gear planes are each a component of a first and a second partial transmission, including the shifting element arranged on the internal combustion engine shaft can be shifted on both sides and is arranged in the axial direction between drive-side hollow shafts of the two partial transmissions, wherein the shifting element is decoupled in a neutral position from the drive side hollow shafts of the two partial transmissions and the shifting element either couples a drive-side hollow shaft of a first partial transmission to the internal combustion engine shaft in a first shifting position or couples a drive-side hollow shaft of a second partial transmission to the internal combustion engine shaft in a second shifting position.

4. The drivetrain as claimed in claim 1, wherein the electric machine shaft is free of fixed gearwheels, which are arranged thereon in a rotationally-fixed manner, of the spur gearwheel sets forming the gear planes.

5. The drivetrain as claimed in claim 1, wherein the pinion shaft is connected via a spur gear step to the output shaft, and all gear planes are arranged in the axial direction between the spur gear step and the electric machine.

6. The drivetrain as claimed in claim 1, wherein the floating pinion-side gearwheel of the hybrid gear plane can be coupled by one of the shifting elements to the pinion shaft, and/or the drive-side gearwheel, which is arranged on the internal combustion shaft, of the hybrid gear plane is a floating gearwheel, which can be coupled by another shifting element to the internal combustion engine shaft.

7. The drivetrain as claimed in claim 1, wherein the electric machine is attached on a pinion side, and for a pinion-side attachment of the electric machine, the electric-machine-side gearwheel of the hybrid gear plane meshes with the pinion-side floating gearwheel rotationally mounted on the pinion shaft.

8. The drivetrain as claimed in claim 1, wherein the electric machine is attached on a drive side, and for a drive-side attachment of the electric machine, the electric-machine-side gearwheel of the hybrid gear plane meshes with the drive-side floating gearwheel rotationally mounted on the internal combustion engine shaft.

9. The drivetrain as claimed in claim 1, wherein one electric-machine-side gearwheel of the hybrid gear plane is attached on a pinion side, and an other electric-machine-side gearwheel of the other hybrid gear plane is attached on a drive side.

10. The drivetrain as claimed in claim 1, wherein the electric machine shaft is connected via a first shifting element to a first hybrid gear plane and is connected using a second shifting element to a second hybrid gear plane.

11. The drivetrain as claimed in claim 10, wherein, an electric-machine-side gearwheel of the first hybrid gear plane is arranged in a rotationally-fixed manner, on a hollow shaft coaxial to the electric machine shaft, and the hollow shaft is connectable via the first shifting element, to the electric machine shaft, and an electric-machine-side gearwheel of a second hybrid gear plane is arranged in a rotationally-fixed manner on a solid shaft guided coaxially through the hollow shaft, and the solid shaft is connectable via the second shifting element.

12. The drivetrain as claimed in claim 11, wherein the first shifting element is a freewheel clutch, and the gearwheel of the first hybrid gear plane is connectable via the freewheel clutch to the hollow shaft attached in a rotationally-fixed manner to the electric machine shaft, and the freewheel clutch is associated with a shifting element, wherein another shifting element permits a torque transmission from the electric machine shaft to the hollow shaft and suppresses it in the opposite direction in a first shifting position, and permits the torque transmission in both directions in a second shifting position.

13. The drivetrain as claimed in claim 12, wherein the second shifting element is a clutch, using which the solid shaft is connectable to the electric machine shaft, wherein an outer plate carrier of the clutch is fixedly attached to both the electric machine shaft and also the hollow shaft.

* * * * *